(12) United States Patent
Kundinger et al.

(10) Patent No.: US 7,303,386 B1
(45) Date of Patent: Dec. 4, 2007

(54) METHOD AND APPARATUS FOR SQUARING AND FLATTENING SHEETS

(76) Inventors: James Kundinger, 2201 W. North Union Rd., Auburn, MI (US) 48611; Stephen Keeley, 8600 S. Cornwell Ave., Claire, MI (US) 48617

( * ) Notice: Subject to any disclaimer, the term of this patent is extended or adjusted under 35 U.S.C. 154(b) by 752 days.

(21) Appl. No.: 10/654,278

(22) Filed: Sep. 2, 2003

Related U.S. Application Data

(60) Provisional application No. 60/407,323, filed on Aug. 30, 2002.

(51) Int. Cl.
*B29C 53/18* (2006.01)
(52) U.S. Cl. .............. 425/472; 425/DIG. 48; 425/388; 271/234
(58) Field of Classification Search ........ 425/DIG. 48, 425/112; 269/97, 85, 309, 310; 264/319; 271/234, 236, 241, 220
See application file for complete search history.

(56) References Cited

U.S. PATENT DOCUMENTS

| 1,921,167 | A | * | 8/1933 | Perry | 271/234 |
| 3,342,480 | A | * | 9/1967 | Camerini et al. | 271/234 |
| 4,919,414 | A | * | 4/1990 | Marschke et al. | 271/227 |
| 4,989,855 | A | * | 2/1991 | Polic | 271/227 |
| 5,980,231 | A | * | 11/1999 | Arends et al. | 425/397 |

\* cited by examiner

*Primary Examiner*—Robert Davis
*Assistant Examiner*—Maria Veronica Ewald
(74) *Attorney, Agent, or Firm*—John R. Benefiel (57) ABSTRACT

Preheated plastic sheets are squared and flattened to be engageable by clamping fingers of clamps on a clamping frame by an array of paddles having vertical and horizontal portions moved to engage any upturned or skewed sheet edges to flatten and square the same as said paddles are simultaneously moved longitudinally and vertically by respective actuators.

5 Claims, 6 Drawing Sheets

METHOD AND APPARATUS FOR SQUARING AND FLATTENING SHEETS

CROSS REFERENCE TO RELATED APPLICATIONS

This application claims the benefit of U.S. provisional Ser. No. 60/407,323, filed Aug. 30, 2002.

BACKGROUND OF THE INVENTION

This invention concerns the handling of plastic sheets in preparation for thermoforming of the sheets into molded articles. In the well known process of thermoforming, plastic sheets are preheated in an oven prior to being shaped by the use of forming molds and fluid pressure.

In one known form of the process, individual rectangular sheets are each clamped in a rectangular clamping frame to be transferred into an oven and thence into a forming station.

In published U.S. Application US 2002/0017745 A1, a slow preheating of the sheets is described with a second rapid heating in a radiant heating station just prior to being formed in a forming station.

Such preheating has been done in a convection oven with pairs of sheets slowly moved through the oven on an indexing vertical conveyor including paddles on which the sheets rest. The pairs of preheated sheets are conveyed out of the convection oven to be clamped into a clamping frame for further processing in a radiant heating station where final heating is done, and thereafter to the forming station.

The preheated sheets are moved into respective clamping frames where clamps grip the edges of the sheets to secure the same in their respective frame.

Problems have been encountered in achieving proper clamping due to bowing and curling of the sheets due to the prior preheating step.

In addition, extensive handling of the sheets are involved in feeding the sheets into the convection oven, conveying the same through the oven, and transferring the preheated sheets out of the oven. Such extensive handling sometimes results in the sheets being skewed when moved into the clamping frame to be slightly misaligned with the frame.

This misalignment can interfere with proper clamping of the sheets in their respective clamping frames.

While sheet squaring devices have heretofore been developed to correct this problem, a sheet flattening capability has not been provided in such devices.

It is the object of the present invention to provide a method and apparatus for providing sheet squaring and flattening insuring proper clamping of preheated sheets within the clamping frames of a thermoformer machine.

SUMMARY OF THE INVENTION

The above object and other objects which will become apparent upon a reading of the following specification and claims, are achieved by a mechanism for flattening and squaring the rectangular sheets prior to clamping the sheets in a rectangular clamping frame. This is accomplished by an array of paddles positioned to engage the perimeter of a sheet supported on a lift table so as to have its edges overhanging the table perimeter. Each paddle has a vertical lower portion and a connected horizontal upper portion.

Each set of one or more paddles are arranged along one side of the sheet, mounted on a bar, opposite pairs thereof driven by an associated actuator for in and out movement towards and away from each other. The paddles are initially positioned in a retracted away position in which the vertical portions of the paddles all clear the sheet edges even when a sheet is presented skewed on the table.

The sets of paddles are all supported on a framework driven vertically by a set of vertically driven shafts so as to be movable down to bring the horizontal paddle portions into contact with any upturned sheet edges and to move the same down to flatten the edges, the horizontal paddles not lowered so far as to restrain the sheet on the table.

The opposite paddle sets are then simultaneously moved towards each other, contacting any skew sheet edges to square the same.

The sheets are positioned within a clamping frame during the flattening and squaring process so that the sheet may be clamped with clamps located between the paddles while being held in a flattened and squared condition.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
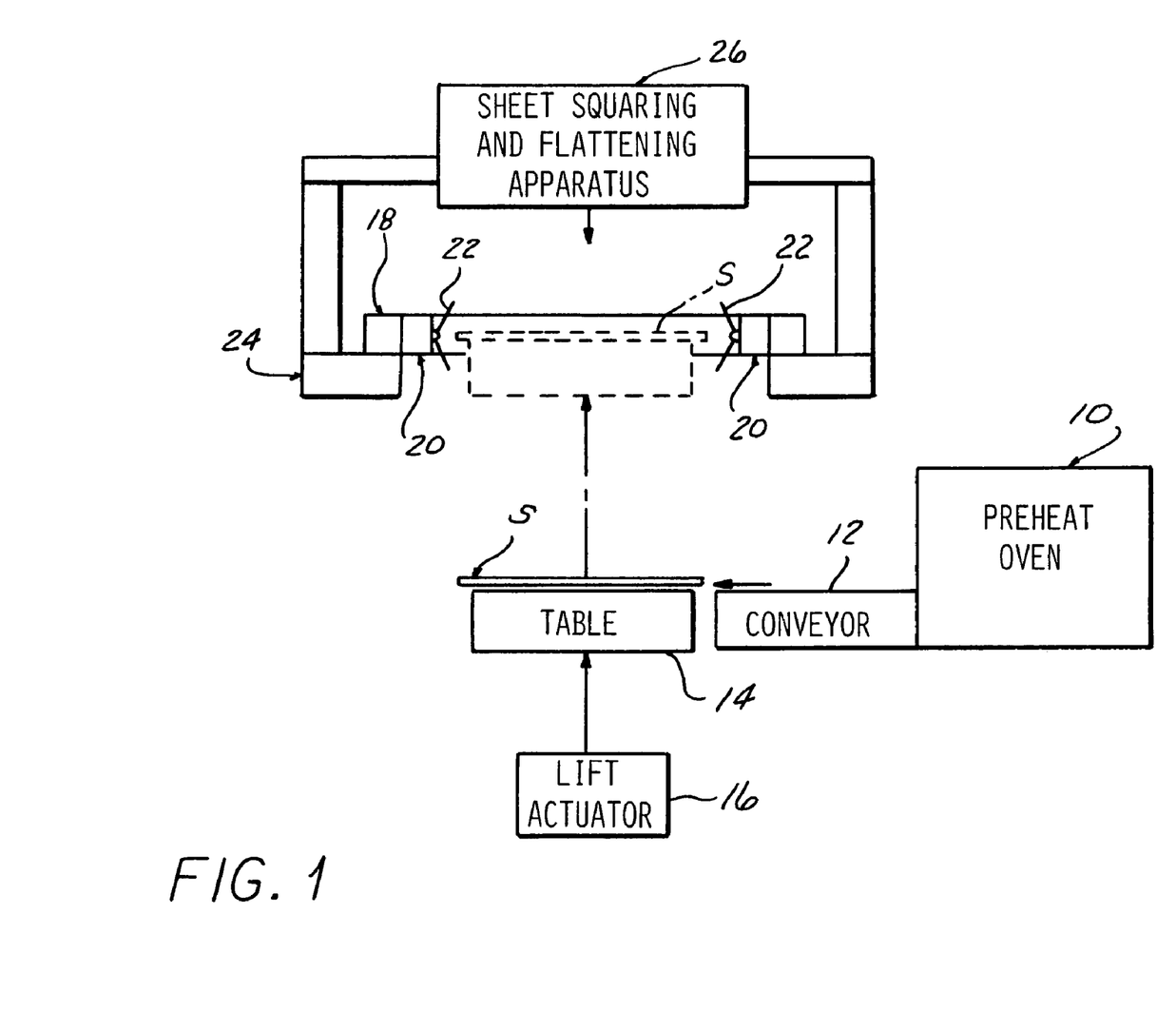
FIG. 1 is a diagram of a part of a thermoforming sheet handling apparatus and a sheet flattening and squaring apparatus according to the present invention.

Referring to the drawings, and particularly FIG. 1, the present invention may be advantageously used with a thermoformer apparatus as described in copending application Ser. No. 10/218,982 filed on Aug. 14, 2002, and published application U.S. 2002/0017745 A1 in which two rectangular sheets are simultaneously processed to form a single part, but can also be used with single sheet thermoforming.

A preheating of pairs of the sheets S is slowly carried out prior to clamping in clamping frame 18, in a convection oven 10.

A conveyor 12 advances each sheet of each pair of sheets S onto a respective lift table 14 which is able to be raised and lowered by an actuator 16. Each sheet S is centered on its lift table so that its edges all overhang the respective sides of the lift table 14.

A rectangular clamping frame 18 can be positioned over each of two sheets S on a respective side by side table 14, so that when the table 14 located therebelow is elevated, the sheet S is positioned within the rectangular opening within the clamping frame 18. The clamping frames 18 are of a well known construction in which a series of clamping cylinders 20 are mounted along inside of the rails defining the frame, having gripping jaws or fingers 22 which are held open when a sheet S is being loaded therein. The sheet S thus clears the open gripping fingers 22 when moved up into the opening within the frame 18 by elevation of the lift table 14.

The clamping frame 18 and clamping cylinders 20 are well known in the art and hence will not be described in further detail. The clamping cylinders 20 may be of a commercially available type in which the clamping fingers 82 are held open by application of fluid pressure to the cylinders 20 and are closed to be applied by a spring force when the cylinder fluid pressure is relieved. This allows transport of the clamping frames 18 through a final heating station and forming station with the sheet clamped therein without the need for applying fluid pressure to the clamping cylinders 20.

The clamping frames 18 may be held on a support structure 24 for upward vertical movement to a transfer system (not shown) which system would move a series of frames 18 horizontally along support rails (not shown) to the thermoforming final heat and forming machine station respectively.

The sheet squaring and flattening apparatus 26 according to the present invention is supported above the clamping frames 18 and may be mounted on the same support structure 24 as indicated diagrammatically in FIG. 1, so as to be movable therewith.

Figure 2:
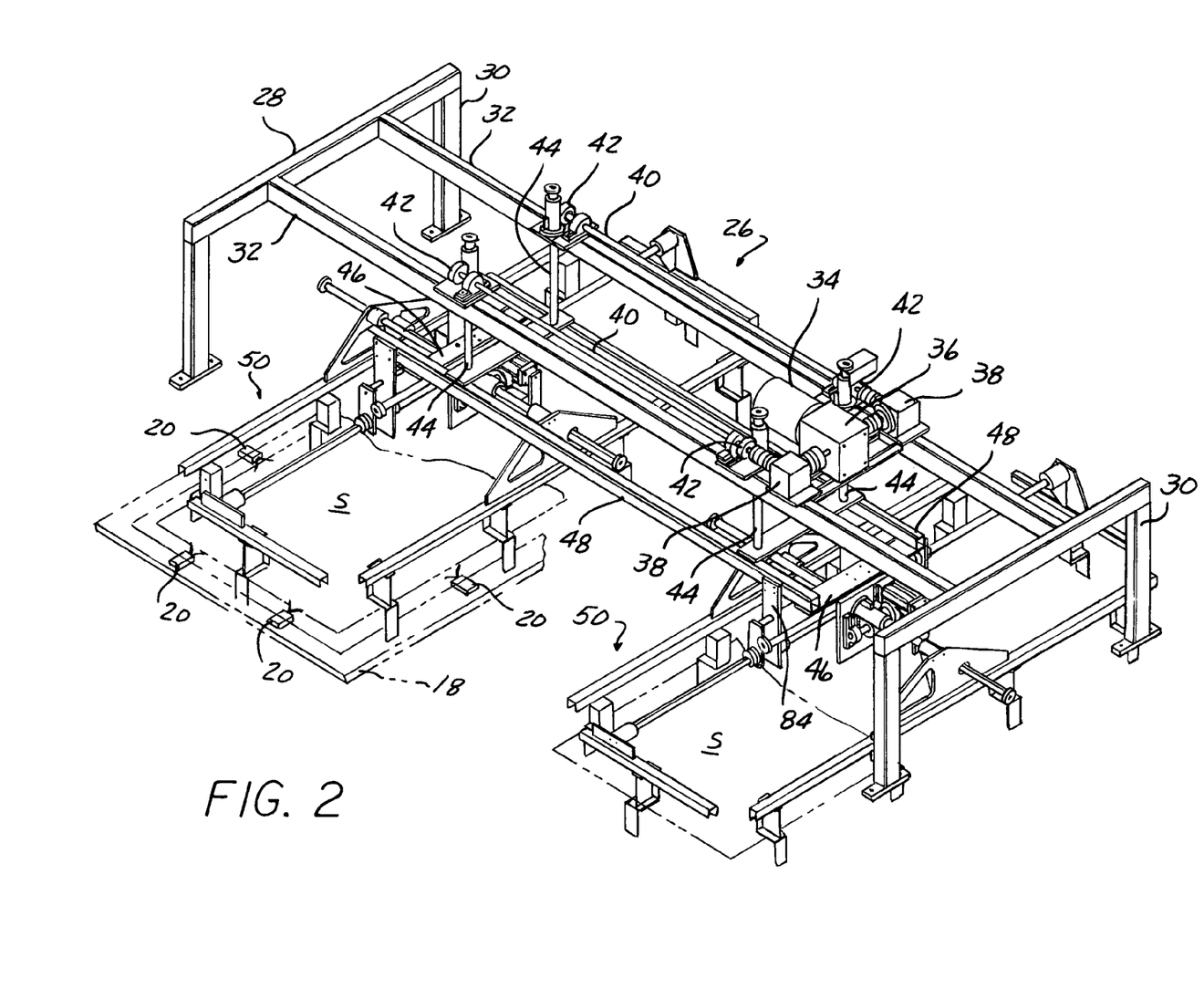
FIG. 2 is a perspective view of a flattening and squaring apparatus according to the present invention designed to act on two sheets at once.
Figure 3:
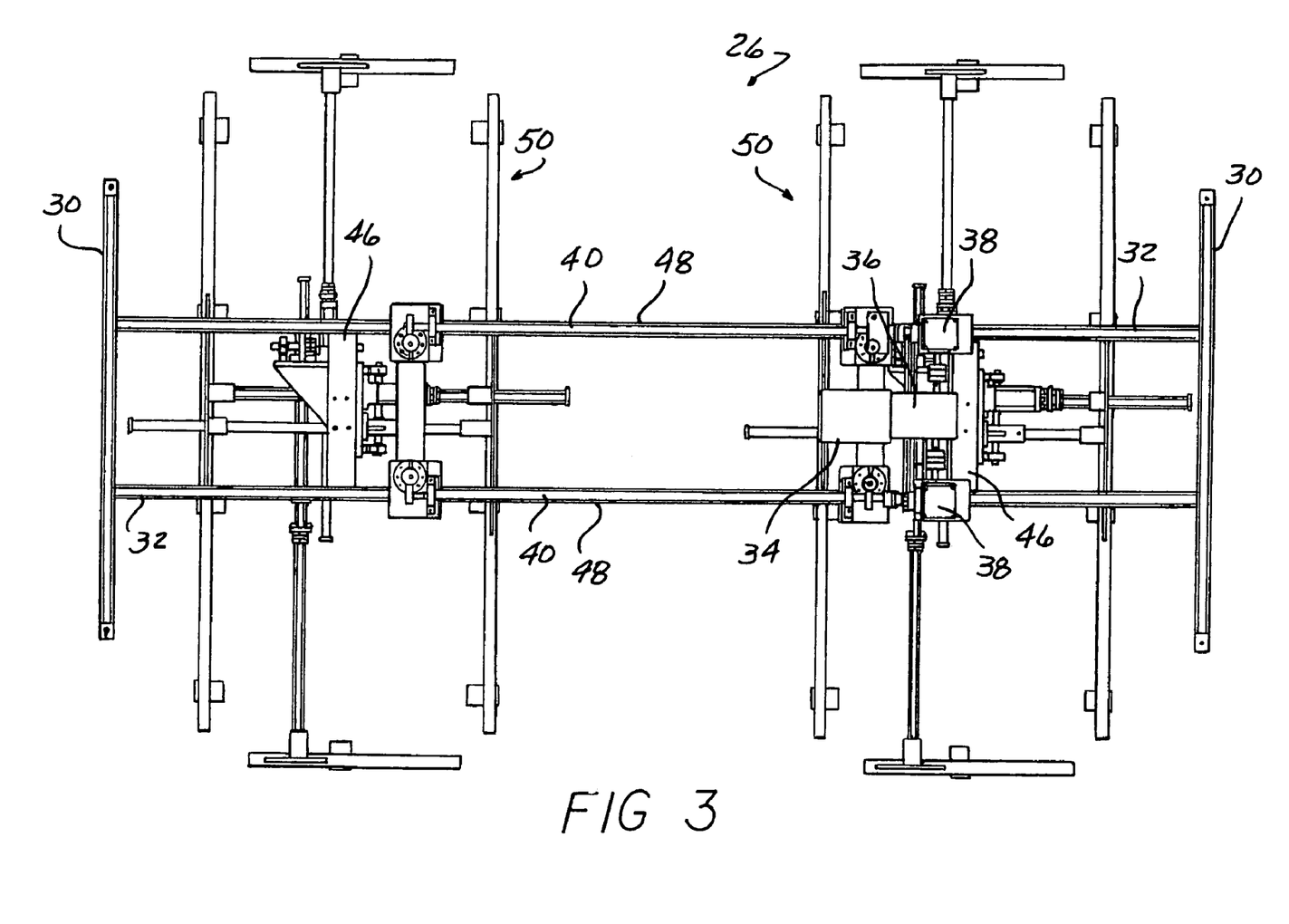
FIG. 3 is a plan view of the apparatus shown in FIG. 2.
Figure 4:
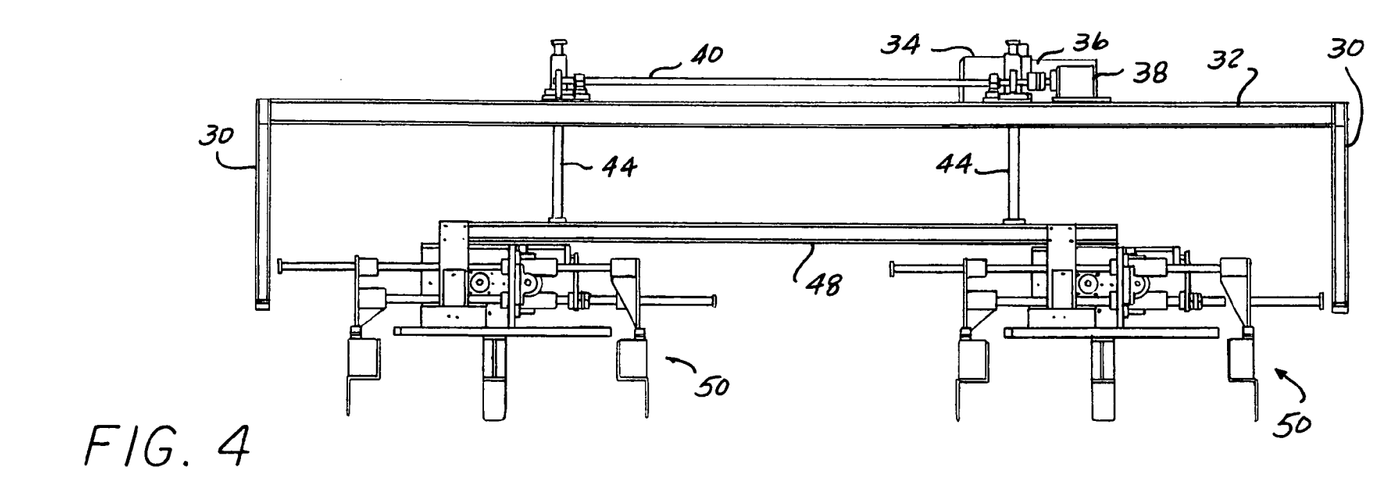
FIG. 4 is an end view of the apparatus shown in FIGS. 2 and 3.
Figure 5:
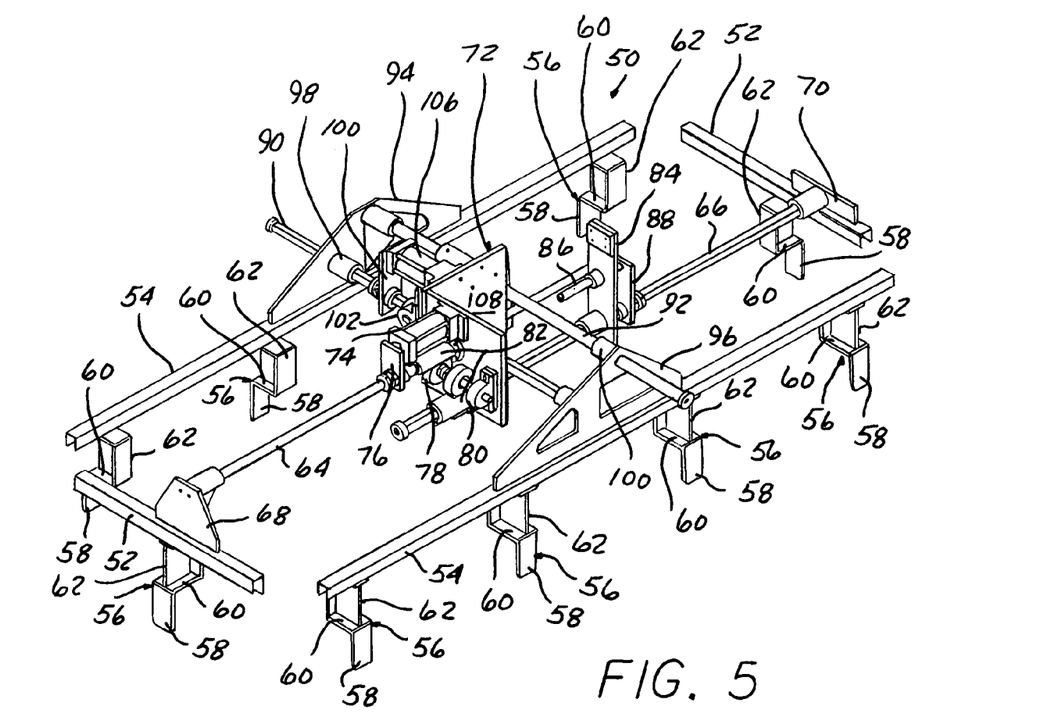
FIG. 5 is an enlarged perspective view of a sheet engaging portion of the apparatus shown in FIGS. 2-4.
Figure 6:
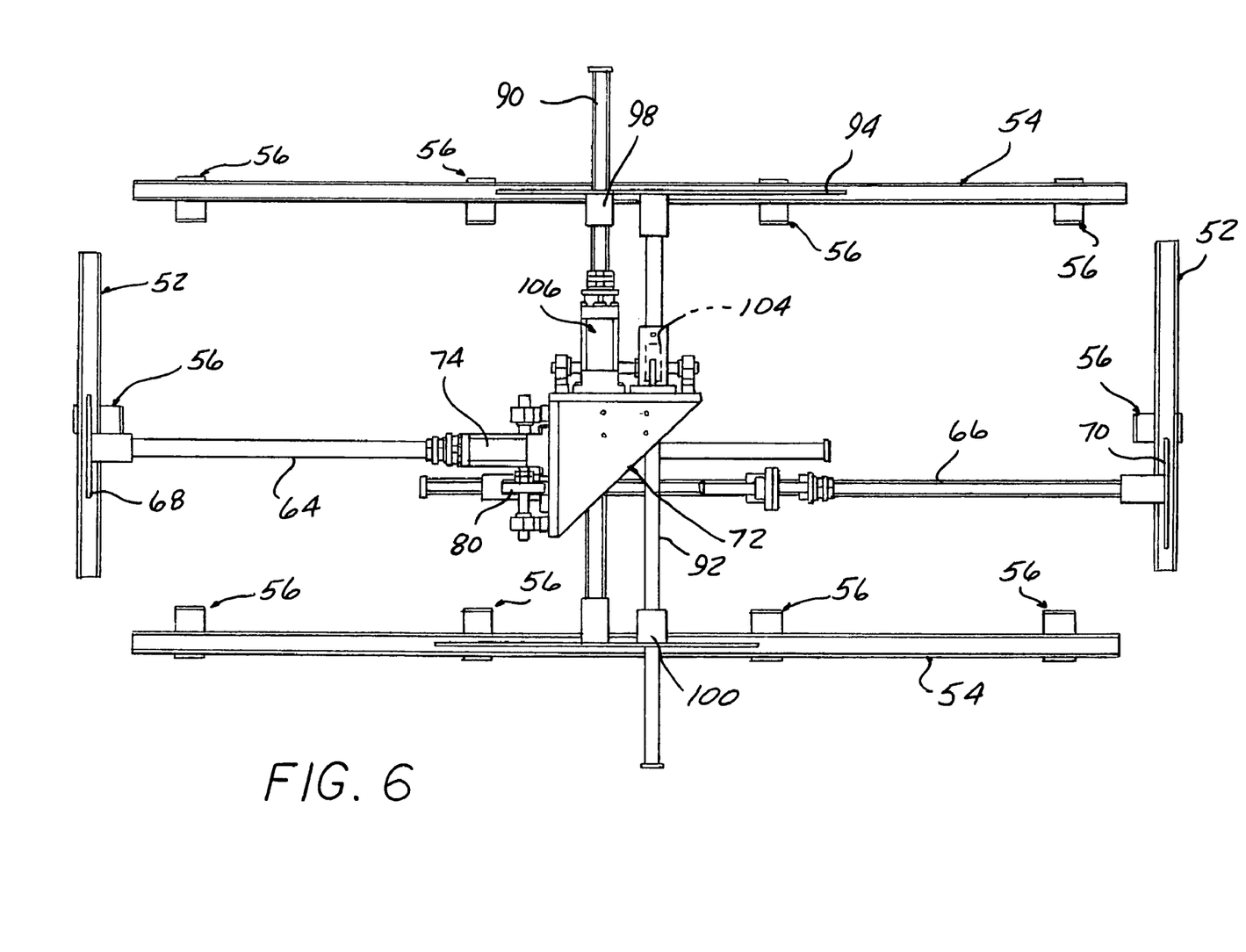
FIG. 6 is a plan view of the portion of the apparatus shown in FIG. 5.
Figure 7:
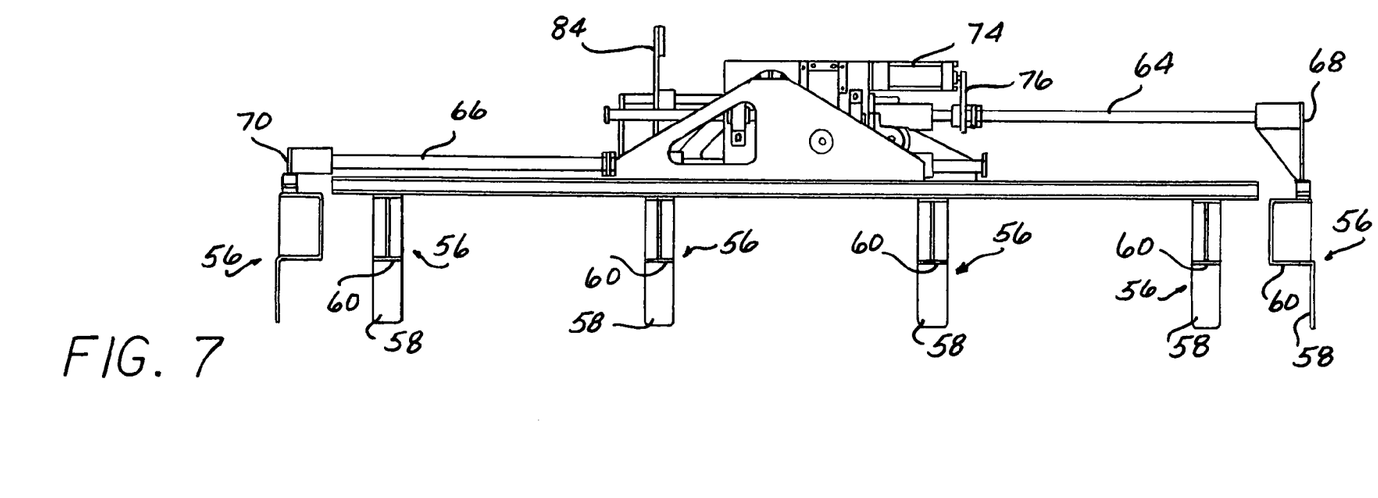
FIG. 7 is a reversed side elevational view of the portion of the apparatus shown in FIGS. 5 and 6.
Figure 8:
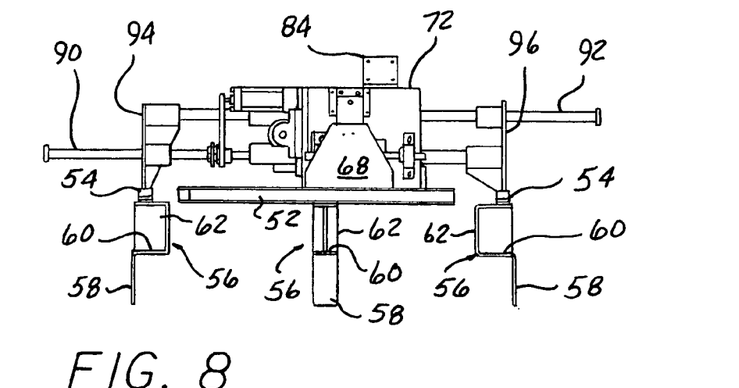
FIG. 8 is an end view of the portion of the apparatus shown in FIGS. 5-7.

FIGS. 2-4 show an apparatus 26 designed to square and flatten two side by side sheets S simultaneously.

An upper framework 28 includes a pair of end structures 30 (which could be attached to the support structure 24) having longitudinal steel beams 32 attached thereto as shown. A drive motor 34 and gear unit 36 on the beams 32 drive two right angle drives 38 which rotate respective drive shafts 40. Each drive shaft 40 drives respective pairs of drive pinion gears 42, each engaged with respective vertical gear racks 44 attached at their lower ends to plates 46 attached to the ends of longitudinal rectangular steel tube members 48. The tube members 48 in turn support two squaring and flattening mechanisms 50. Activation of the motor 34 causes each gear rack 44 to be moved up or down while remaining level and in perfect synchronism with each other in order to position each mechanism for a purpose as will be described below in reference to FIGS. 5-8.

FIGS. 5-8 show details of each squaring and flattening mechanism 50, which includes a rectangular arrangement of pairs of elongated U channel end bars 52 and longitudinal bars 54.

A rectangular array of paddles 56 are attached to be suspended below the bars 52, 54. The paddles 56 are located to be disposed in spaces between the clamping cylinder 20 so as to be able to engage the overhanging edges of a sheet S disposed on a lift table 14.

The paddles 56 each comprise a right angle plate having a lower depending vertical portion 58 integral with an upper horizontal portion 60. A support bracket 62 is attached to the upper portion 60 of each paddle 56 and to one of the bars 52 or 54.

The two end bars 52 are attached to one end of one of two gear rack shafts 64, 66 by means of bracket plates 68, 70 affixed to the top of a respective bar 52.

A main mounting bracket 72 mounts a power cylinder 74 which can drive the gear rack shaft 64 in a lengthwise direction via a connector plate 76.

The gear rack shaft 64 has bottom gear teeth drivingly engage a first gear 78 which rotates a second gear 80 drivingly engaging gear teeth on the top of the gear rack shaft 66 so cause lengthwise motion of the shaft 66 in the same direction, moving bars 52 towards or away from each other to bring the attached oppositely located vertical paddle portions 58 closer together or further apart in synchronism with each other.

The gear shafts 64, 66 are each supported in linear bearings 80 on the main bracket 72.

An auxiliary support plate 84 is attached to one of the rails 48 and guides the gear shaft 66 with guide shaft 86 and plate 88. This provides intermediate support to reduce vibration of the gear shaft 66.

Similarly, the lengthwise bars 54 have a series of paddles 56 attached along their length.

A second pair of gear rack shafts 90, 92 each have one end attached to one of the bars 54 by means of a bracket plate 94, 96. The opposite end of each shaft 90, 92 is guided in a linear bearing 98, 100 mounted to a respective bracket 94, 96.

A power cylinder 106 drives gear rack shaft 90 by means of a plate connection 100. A gear 102 is driven by engagement with the gear rack teeth on top of shaft 90 to rotate a connected gear 104 engaged with gear rack teeth on the bottom of shaft 92. Thus, both shafts 90, 92 are driven longitudinally in synchronism by operation of the power cylinder 106 to move bars 54 and oppositely located sets of paddles 56 mounted simultaneously thereon towards or away from each other.

Each main bracket 72 has a top plate 108 is attached to a cross plate 46 so that motion of the vertical gear posts 44 raise and lower both mechanisms 50.

The power cylinders 74, 106 and motor 34 are controlled by a suitable programmed industrial controller as is typically used to control other components of a thermoformer with which the apparatus of the present invention is used so that the bars 52, 54 are initially retracted apart. Thus, even if the sheets S are skewed somewhat, the depending portions 60 of the paddles 56 will clear the edges of the sheet S when the mechanisms 50 are lowered by operation of the motor 34 after the sheets S are elevated to be positioned within the clamping frames 18.

The mechanisms 50 are lowered to bring the horizontal portion 58 of the horizontal paddles 56 into engagement with an upwardly curled or bowed overhanging edges of the sheets S and force the same down into the main plane of the sheet S.

Subsequently, the power cylinders 74 and 106 are operated to bring the vertical paddle portions 60 towards each other, engaging any sheet skewed side edges to square up the sheet S.

The clamps 20 are then operated to reliably clamp the sheet edges with clamping fingers 22.

The movement of the paddles 56 is controlled to flatten any curled edges of the sheets S without undue pressure.

Similarly, the inward motion of the vertical paddle portions 60 is controlled to just square the sheets S.

The invention claimed is:

1. An apparatus for clamping individual preheated rectangular plastic sheets prior to clamping said sheets in a rectangular clamping frame having a central rectangular opening, comprising:

a lift table able to be elevated to a raised position from a lowered position whereat said lift table may receive a preheated sheet conveyed out from an oven, said table sized so that each edge sheet deposited thereon overhangs a side of said lift table, said clamping frame positioned above and aligned with said table so that a sheet deposited on said lifting table is positioned within said clamping frame opening upon elevation of said lift table to said raised position;

said clamping frame opening having a series of clamps arranged about each of four sides of said clamping frame opening, said clamps each having clamping fingers extending into said frame opening and held open preparatory to receiving a sheet on said lifting table and closed to grippingly engage an edge on a sheet positioned within said clamping frame opening;

a squaring mechanism including a rectangular array of paddles mounted arranged along each side of a rectangular array of elongated supports aligned with said clamping frame;

opposite pairs of said elongated supports driven by a horizontal actuator to be moved horizontally towards each other from a retracted fully separated position to an advanced position spaced apart a distance corresponding to a dimension of said sheet, said elongated supports positioning a vertical portion of said paddles within but above said clamping frame opening and outside a respective sheet side when said elongated supports are in said fully retracted position;

said paddles each having a horizontal portion above said vertical portion and positioned above said lift table and over an overhanging edge of said sheet; and said paddles and elongated supports collectively driven vertically by a vertical actuator to bring said paddle vertical portions within said clamping frame opening and to engage and flatten curled up edges with said horizontal portions as said paddles are lowered by said vertical actuator to bring said vertical portions within said clamping frame opening and to square said sheet within said clamping frame upon subsequent operation of said horizontal actuator moving said vertical portions together and thereby insuring that said clamping fingers are engagable with said sheet upon operation of said clamps.

2. The apparatus according to claim 1 wherein each of said paddles are located in between a respective pair of said clamps.

3. The apparatus according to claim 1 wherein said horizontal actuator for each opposite pair of supports comprise a pair of parallel gear rack shafts, each attached at one end to a respective one of said paddle elongated supports, said gear rack shafts engaged by a respective one of a pair of pinion gears rotated in synchronism so that said gear rack shafts move in opposite directions bringing said elongated supports together or apart.

4. The apparatus according to claim 1 wherein vertical posts are attached at one end to a mounting structure for said horizontal actuator, said posts driven up and down by said vertical actuator.

5. The apparatus according to claim 1 wherein a second lift table is disposed alongside said first mentioned lift table and a second clamping frame is positioned above said second lifting table and having an opening aligned with said lifting table to receive a second sheet conveyed from said oven to have edges overhanging to be engageable with clamping fingers of a series of clamps arrayed about the inside of said clamp frame openings, and a second array of paddles mounted about the inside of said second clamping frame opening, and a rectangular array of elongated paddle support bars, each paddle having a vertical portion able to be disposed within said clamping frame opening and a horizontal portion above said second lift table and over an overhanging edge of a sheet thereof; a second horizontal actuator for moving opposite pairs of elongated bar supports towards and away from each other to engage engagement of the edges of a sheet on said second lift table by inward movement from a retracted separated position of said paddles to square said second sheet pair to insure gripping engagement of said clamping fingers with said sheet edges; and a second vertical actuator for moving said paddles down to engage any curled up edge of said sheet to flatten the same prior to operation of said second horizontal actuator.

* * * * *

UNITED STATES PATENT AND TRADEMARK OFFICE
CERTIFICATE OF CORRECTION

| | | |
|---|---|---|
| PATENT NO. | : 7,303,386 B1 | Page 1 of 1 |
| APPLICATION NO. | : 10/654278 | |
| DATED | : December 4, 2007 | |
| INVENTOR(S) | : James Kundinger et al. | |

It is certified that error appears in the above-identified patent and that said Letters Patent is hereby corrected as shown below:

Title page, item [73] Assignee should read Brown Machine, LLC.

Signed and Sealed this

Seventeenth Day of June, 2008

JON W. DUDAS
*Director of the United States Patent and Trademark Office*